Fig. 2

United States Patent Office 3,201,569
Patented Aug. 17, 1965

3,201,569
MARK SELECTION CIRCUIT
Gregory F. Conron, New Canaan, Conn., assignor to United Aircraft Corporation, East Hartford, Conn., a corporation of Delaware
Filed June 12, 1961, Ser. No. 116,352
21 Claims. (Cl. 235—61.7)

My invention relates to a mark selection circuit and more particularly to a circuit for detecting the ratio of intensities of candidate's marks in educational test scoring machines.

In the prior art both parallel and serial reading systems have been employed to determine the position of a candidate's intended mark for a given number of possible marking positions in an item. In parallel reading systems of the prior art, each marking position can yield either a mark or no mark. This is determined by whether the intensity of a particular marking position is above or below a certain predetermined level. With a plurality of marking positions for each item, several marking positions may exceed the predetermined level if the candidate has changed an answer without completely erasing his original mark. This may erroneously indicate that the candidate has intentionally marked more than one position in an item.

In serial reading systems of the prior art, the intensity of a marked position is employed to unilaterally charge a storage capacitor or other storage device. Thus the marked position selected is the most intense. This will of course yield only one position as that which the candidate has intentionally marked. However, such serial reading systems cannot discriminate against a situation where the candidate has marked two positions with substantially equal intensity, one position being only slightly more intense than another. Whereas the candidate may have accidentally or intentionally marked two or more positions, the system will indicate only that mark of greatest intensity. If a candidate were to intentionally mark every position with substantially equal intensity, such serial reading systems of the prior art could not detect the fact. Accordingly, serial reading systems of the prior art cannot detect an accidental or intentional multiple mark condition.

In educational test scoring machines it is desirable to know if a multiple mark condition exists. If such condition is present in a test answer item, then such item should be marked "wrong" because of multiple guessing. If such condition exists for an item relating to candidate information, such as school or seat or test identification, then the entire test should not be machine scored because of possible ambiguity in information to be transcribed.

I have invented a mark selection circuit which serially reads the intensity of marks in the various marking positions of an item. My circuit determines the ratio, whether it be greater or less than unity, between the two marks of greatest intensity. If this ratio does not differ sufficiently from unity, then an output indicating a multiple mark condition is generated. My system thus measures signal ratios and provides an output indicating the most intensely marked position only if a multiple mark condition does not exist. I also determine whether the candidate's marks are sufficiently intense to be machine scored or whether such marks are so faint as to be unscorable.

One object of my invention is to provide a mark selection circuit providing an intermediate ouput indicating the marking position of greatest intensity.

Another object of my invention is to provide a mark selection circuit in which the ratio of intensities of the two most intense marks in an item is compared with unity; and if such ratio does not differ sufficiently from unity, a multiple mark signal is generated.

A further object of my invention is to provide a mark selection circuit in which a multiple mark condition in an answer item forces a "wrong" response even though the most intensely marked position be correct.

Still a further object of my invention is to provide a mark selection circuit in which a multiple mark condition for an item of candidate information causes an answer sheet to be shunted aside for manual interpretation.

A still further object of my invention is to provide a mark selection circuit in which answer sheets are shunted aside for manual interpretation where marks are so faint as to be unscorable.

Other and further objects of my invention will appear from the following description:

In general my invention contemplates provision of a storage capacitor which is charged according to the intensity of the most intense of all previously read marks in an item. I provide a signal according to the intensity of the presently read mark in an item. These two voltages are coupled to a pair of comparator circuits. One comparator circuit determines if the ratio of the intensity of the presently read mark to the maximum intensity of all previously read marks is greater than unity by a predetermined amount. The other comparator circuit determines if this ratio is less than unity by a predetermined amount. I provide a bi-stable flip-flop which generates an output signal indicating whether or not a multiple mark condition exists. The first comparator is used to trigger the flip-flop to a state indicating that no multiple mark condition exists. The first and second comparators are employed to trigger the flip-flop to the multiple mark condition. There are three regions of interest. In the first region the present signal is sufficiently greater than the maximum of all previous signals that the first comparator triggers the flip-flop to indicate no multiple mark condition exists. In the second region the present signal does not differ sufficiently from the maximum of all previous signals to prevent the first and second comparators from triggering the flip-flop to a multiple mark condition. In the third region the present signal is sufficiently less than the maximum of all previous signals so that the second comparator prevents the flip-flop from being triggered to indicate a multiple mark condition. In the third region the flip-flop receives no triggering signals and is permitted to remain in its former state. The final condition of the flip-flop after the reading of all marking positions in an item indicates whether, for such item, a multiple mark condition exists.

In the accompanying drawings which form part of the instant specification and which are to be read in conjunction therewith and in which like reference numerals are used to indicate like parts in the various views:

FIGURE 2 is a view on an enlarged scale showing an unmarked answer sheet.

Figure 2:
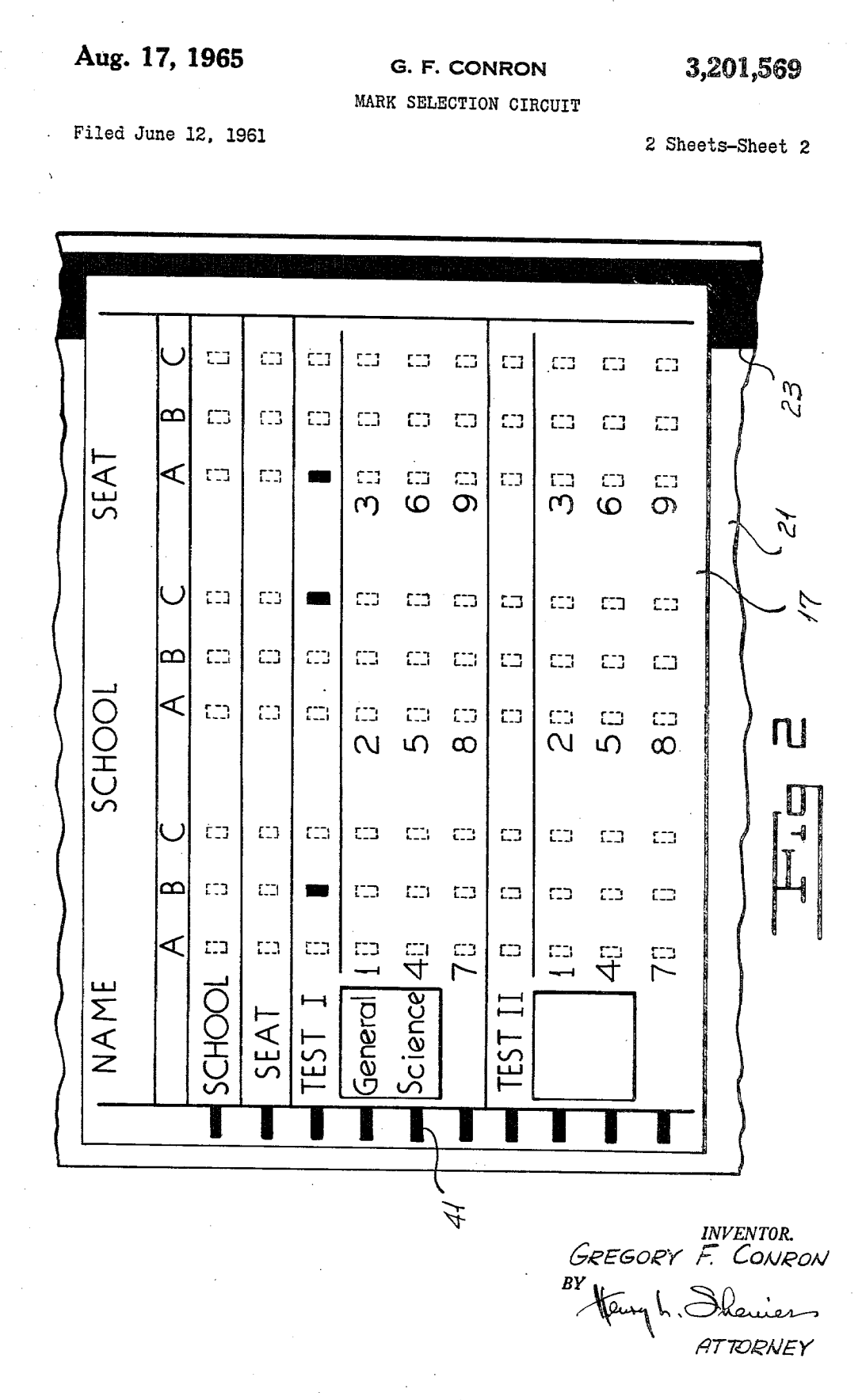
Figure 1:
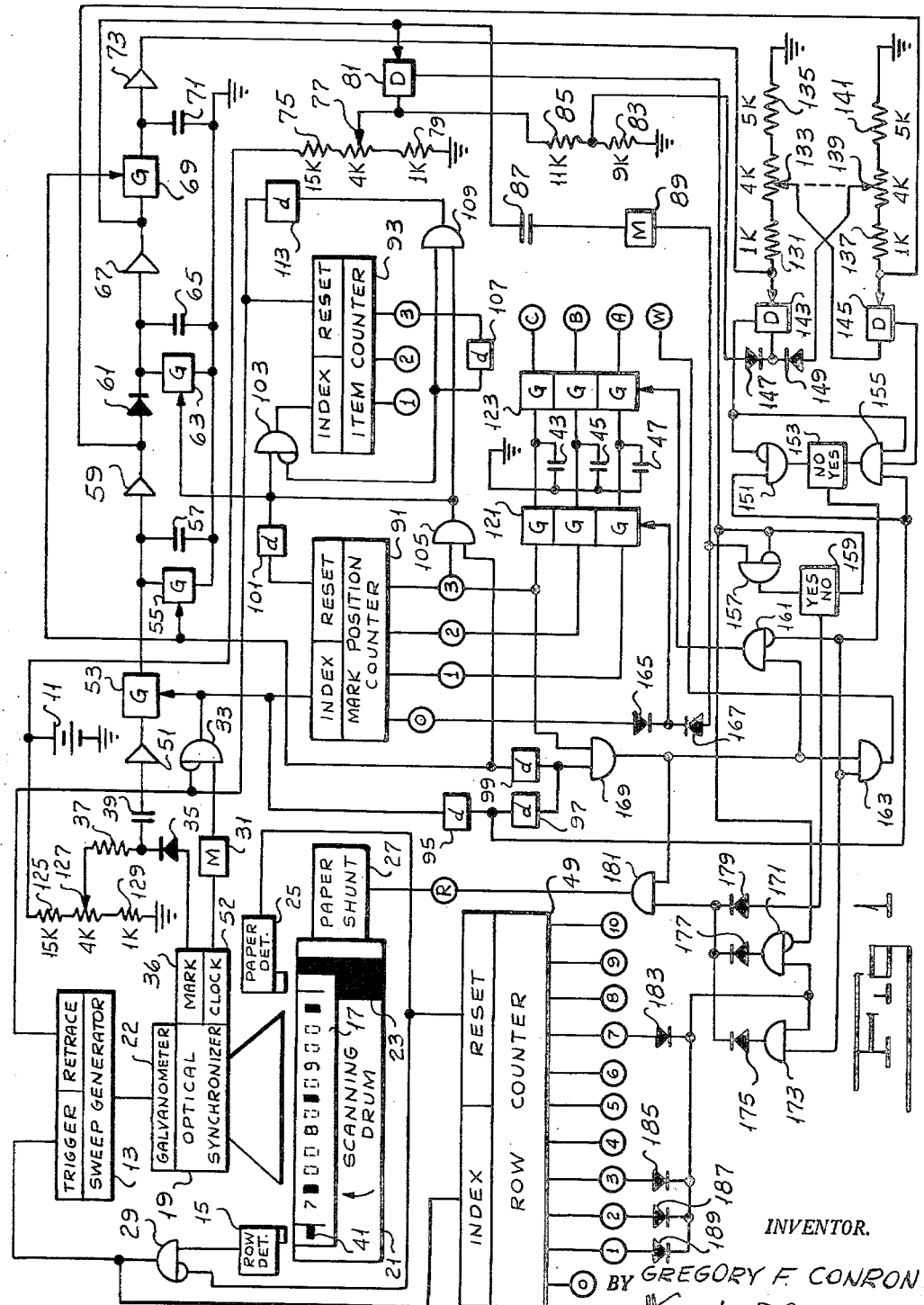
FIGURE 1 is a schematic view showing the scoring of a marked answer sheet.

More particularly referring now to FIGURE 2, the answer sheet 17 is provided with spaces in which the candidate may write his name and his school and his seat. Along the left margin of answer sheet 17 are provided ten black marks 41 corresponding to the ten rows of marking positions. Each of the ten rows is provided with nine columns of marking positions in three groups of three each. Each group of three in the marking positions of a row comprises an item. In each row there are three items each having three marking positions which are lettered A, B, and C. The candidate encodes his school by entering one mark in each of the three items in the first row. The candidate further encodes his seat by placing one mark in each of the three items in the second row. Test I is a fixed battery test which is shown as being "General Science." The identification of Test I is permanently recorded by one mark in each of the three items of the third row. Thus the coding for Test I is BCA. The first item in the code identification of Test I is marked in the B marking position; the second item in the code identification of Test I is marked in the C marking position; and the third item in the coding of Test I is marked in the A marking position. The General Science Test I is provided with answer items 1 through 9 in rows 4 through 6. The three-item code identification for Test II is in row 7. The candidate selects the particular test he wishes to take, such as Chemistry or Physics or Biology, writes the name of the test in the box associated with Test II, and encodes this in the three-item identification for Test II in row 7. Test II is provided with answer items 1 through 9 in rows 8 through 10.

Referring now to FIGURES 1 and 2, the paper 17 is conducted by suitable paper handling equipment well known to the art to a scanning drum 21. The right-hand margin of paper 17 is left vacant. Drum 21 is provided with a black non-reflecting band 23 which is positioned under the vacant right-hand margin of paper 17. The test paper 17 is of a light, preferably white, color which is a good reflector of light. The fixed battery three-item encoding for Test I in row 3 and the row marks 41 along the left-hand margin of paper 17 are preprinted in a black or dark-blue non-reflecting color.

Referring now to FIGURE 1, a row detector 15 is provided which, with rotation of drum 21, scans the row marks 41. As will be appreciated by those skilled in the art, row detector 15 comprises a source of light which is directed through an aperture toward the paper 17. Reflected light is coupled to a photo-tube which provides an output signal whenever the occurrence of a row mark 41 reduces the reflected light below its normal intensity. A paper detector 25 scans the right-hand margin of paper 17. Paper detector 25, which is similar in construction to row detector 15, provides an output signal after the paper 17 has passed the scanning position and until a new paper reaches the scanning position, because of the lack of reflected light when band 23 is not covered. I provided an Optical Synchronizer 19 which is more fully shown and described in the copending application of Orville V. Greunke, Serial No. 74,509, filed December 8, 1960, now Patent No. 3,060,319. The optical synchronizer 19 comprises a galvanometer 22 which directs a first beam of light toward the paper 17 and a second beam synchronously toward a Lucite rod. The Lucite rod is provided with grooves which disperse the second beam and transmit the dispersed light down the rod to a photomultiplier tube 52 which provides clock pulses in synchronism with the marking positions of a row. A mark photomultiplier 36 receives light reflected from paper 17 and provides outputs proportional to the reduction of light in accordance with the intensity or blackness of a candidate's mark. In FIGURE 1 the candidate has marked for Test II position A in question 7, position B in question 8, and position C in question 9. Each mark output 36 will occur synchronously with the various clock outputs 52. Galvanometer 22 causes the first beam of light to sweep across a row of marking positions and is accordingly driven by a sweep generator 13 which is triggered to provide a slowly rising and rapidly retraced current saw-tooth wave-form. The output of the clock photomultiplier 52 is coupled to a monostable flip-flop 31. The output of monostable flip-flop 31 is coupled to one input of an AND circuit 33. The negative terminal of a reference battery 11 is grounded. The positive terminal of battery 11 is connected to ground through a variable voltage divider comprising 15K resistor 125, 4K potentiometer 127, and 1K resistor 129. The slider of background potentiometer 127 is connected through a high-impedance resistor 37 to the cathode of a clipping crystal 35. The output of the mark photomultiplier 36 is connected to the anode of crystal 35. The cathode of crystal 35 is connected through a blocking capacitor 39 to the input of a buffer amplifier 51. The output of amplifier 51 is coupled through a gate 53 to one terminal of a storage capacitor 57 and to the input of a buffer amplifier 59. The output of amplifier 59 is connected forwardly through a crystal 61 to one terminal of a storage capacitor 65 and to the input of a buffer amplifier 67. The output of amplifier 67 is connected through a gate 69 to one terminal of a capacitor 71 and to the input of buffer amplifier 73. The other terminal of each of capacitors 57, 65, and 71 is grounded. Capacitor 57 is shunted by a discharging gate 55; and capacitor 65 is shunted by a discharging gate 63. The output of AND circuit 33 is connected to the control input of gate 53 and to the indexing input of a mark position counter 91. Mark position counter 91 provides outputs at four terminals representing respectively $\underline{0}$, $\underline{1}$, $\underline{2}$, and $\underline{3}$. The output of AND circuit 33 is coupled serially through delay networks 95 and 97 and 99 to the control inputs of gates 55 and 69. The output of delay network 99 is connected to one input of an AND circuit 105. The $\underline{3}$ output of mark position counter 91 is connected to the other input of AND circuit 105. The output of AND circuit 105 is connected to one input of an AND circuit 109, to one input of an AND circuit 103, to the control input of gate 63, and through a delay network 101 to the resetting input of mark position counter 91. The output of AND circuit 103 is connected to the indexing input of an item counter 93. Item counter 93 provides outputs at three terminals representing respectively $\underline{1}$, $\underline{2}$, and $\underline{3}$. The $\underline{3}$ output of item counter 93 is connected through a delay network 107 to the other input of AND circuit 109. The output of delay network 107 is also inverted and applied to the other input of AND circuit 103. The output of AND circuit 109 is connected through a delay network 113 to the resetting input of item counter 93 and to the retrace input of sweep generator 13. The output of delay network 113 is also inverted and applied to the other input of AND circuit 33. The output of row detector 15 is connected to one input of an AND circuit 29. The output of AND circuit 29 is connected to the trigger input of sweep generator 13 and to the indexing input of a row counter 49. Row counter 49 provides outputs at eleven terminals representing respectively $\underline{0}$, $\underline{1}$, $\underline{2}$, $\underline{3}$, . . . $\underline{7}$, $\underline{8}$, $\underline{9}$, and $\underline{10}$. The output of paper detector 25 is connected to the resetting input of row counter 49. The output of paper detector 25 is also inverted and applied to the other input of AND circuit 29. The positive terminal of battery 11 is connected to ground through a variable voltage divider comprising 15K resistor 75, 4K potentiometer 77, and 1K resistor 79. The slider of unscorable level potentiometer 77 is connected to the reference terminal of a high-gain differential amplifier 81. The output of buffer amplifier 67 is connected to the input terminal of differential amplifier 81 and through a differentiating capacitor 87 to the input of a monostable flip-flop 89. The output of monostable flip-flop 89 is connected forwardly through a crystal 167 to the control input of simultaneous gates 121. The $\underline{0}$ output of mark position counter 91 is connected forwardly through a crystal 165 to the control input of gates 121. I provide another plurality of simultaneous gates 123. The $\underline{1}$ output of mark position counter 91 is connected through one of the gates 121 to one terminal of a capacitor 47, which in turn is connected through one of the gates 123 to a terminal A. The $\underline{2}$ output of mark position counter 91 is connected through a second of the gates 121 to one terminal of a capacitor 45, which in turn is connected through a second of the gates 123 to a terminal B. The $\underline{3}$ output terminal of mark position counter 91 is connected through the third of the gates 121 to one terminal of a capacitor 43, which in turn is connected through the third of the gates 123 to a terminal C. The other terminal of each of capacitors 43, 45, and 47 is grounded. The slider of potentiometer 77 is connected to ground through a fixed set-off voltage divider comprising an 11K resistor 83, and a 9K resistor 85. The junction of resistors 83 and 85 is connected forwardly through a crystal 147 to the reference terminal of a high-gain differential amplifier 143. The output of buffer amplifier 73 is connected to the input terminal of differential amplifier 143 and to ground through a variable voltage divider comprising a 1K resistor 131, a 4K potentiometer 133, and a 5K resistor 135. The output of buffer amplifier 59 is connected to the input terminal of a high-gain differential amplifier 145 and to ground through a variable voltage divider comprising a 1K resistor 137, a 4K potentiometer 139, and a 5K resistor 141. The slider of potentiometer 133 is connected to the reference terminal of differential amplifier 145. The slider of potentiometer 139 is connected forwardly through a crystal 149 to the reference terminal of differential amplifier 143. The sliders of potentiometers 133 and 139 are ganged together. The output of differential amplifier 145 is connected to one input of an AND circuit 155. The output of differential amplifier 143 is connected to a second input of AND circuit 155. The output of differential amplifier 143 is inverted and applied to one input of an AND circuit 151. The output of delay network 95 is connected to the other input of AND circuit 151 and to the third input of AND 155. The output of AND circuit 155 is connected to the "YES" input terminal of a bi-stable multiple mark flip-flop 153. The output of AND circuit 151 is connected to the "NO" input terminal of bi-stable multiple mark flip-flop 153. The output of differential amplifier 81 is inverted and applied to one input of an AND circuit 157. The output of monostable flip-flop 89 is connected to the other input of AND circuit 157. The output of AND circuit 157 is connected to the "YES" input terminal of a bi-stable unscorable flip-flop 159. The output of differential amplifier 81 is connected to the "NO" input terminal of bi-stable unscorable flip-flop 159. The output of multiple mark flip-flop 153 is inverted and applied to one input of AND circuit 161. The output of AND circuit 161 is connected to the control input of gates 123. The output of multiple mark flip-flop 153 is also connected to one input of each of AND circuits 163 and 173. The output of delay network 97 is connected to one input of an AND circuit 169. The 3 output of mark position counter 91 is connected to the other input of AND circuit 169. The output of AND circuit 169 is connected to the other input of each of AND circuits 161 and 163 and to one input of an AND circuit 181. The output of AND circuit 163 is connected to a terminal W. The output of unscorable flip-flop 159 is connected to the anode of a crystal 179. The output of differential amplifier 81 is inverted and applied to one input of an AND circuit 171. The 1, 2, 3, and 7 outputs of row counter 49 are connected to the anodes of respective crystals 189, 187, 185, and 183. The cathodes of crystals 183, 185, 187, and 189 are connected to the other input of each of AND circuits 171 and 173. The outputs of AND circuits 171 and 173 respectively are connected to the anodes of crystals 177 and 175. The cathodes of crystals 175, 177, and 179 are connected to the other input of AND circuit 181. The output of AND circuit 181 is connected to a terminal R and to a paper shunting mechanism 27.

In operation of my mark selection circuit the paper 17 is fed by suitable handling equipment, not shown, to the scanning drum 21 so that row detector 15 operates along the left-hand margin and paper detector 25 operates along the right-hand margin of paper 17. Before paper 17 reaches the scanning position, detector 25 sees only the black band 23 on scanning drum 21. Paper detector 25 thus provides an output signal resetting row counter 49 to 0 and disabling AND circuit 29 preventing its response to row detector 15. When paper 17 reaches the scanning position, the output of paper detector 25 drops to ground potential, enabling AND circuit 29 to respond to row detector 15. When the first of row marks 41 on the left-hand margin of paper 17 passes the scanning position, row detector 15 produces an output pulse which in turn produces an output pulse from AND circuit 29. This indexes row counter 49 from 0 to 1 and triggers sweep generator 13 which drives galvanometer 22 of synchronizer 19. Photomultiplier 52 provides clock pulses which are standardized by monostable flip-flop 31. Initially mark position counter 91 will provide a 0 output; and item counter 93 will provide a 1 output. The 0 output of counter 91 actuates the gates 121 thereby discharging capacitors 43, 45, 47. Since counter 93 provides a 1 output, no signal appears at the output of AND circuit 109 or at the inverted input of AND circuit 33. AND circuit 33 is thus enabled to pass standardized clock pulses from monostable flip-flop 31. The first clock pulse of the first row indexes counter 91 from 0 to 1. The second clock pulse indexes the counter from 1 to 2; and the third clock pulse indexes the counter from 2 to 3. The third clock pulse from AND circuit 33 is delayed by networks 95, 97, and 99. The delayed clock pulse from network 99 causes AND circuit 105 to produce a pulse which is passed through AND circuit 103 to index the item counter from 1 to 2 and which resets mark position counter 91 from 3 to 0. The purpose of delay network 101 is to permit the third clock pulse to pass through AND circuit 105 before counter 91 is reset to 0, thereby disabling AND circuit 105. The fourth clock pulse indexes counter 91 from 0 to 1. The fifth clock pulse idexes counter 91 from 1 to 2. The sixth clock pulse indexes counter 91 from 2 to 3, whereupon the delayed sixth clock pulse from network 99 resets counter 91 from 3 to 0 and indexes item counter 93 from 2 to 3. The 3 output of item counter 93 enables AND circuit 109 and disables AND circuit 103. The purpose of delay network 107 is to insure that the output pulse from AND circuit 105 has decayed before the enabling of AND circuit 109 and the disabling of AND circuit 103. The seventh clock pulse indexes counter 91 from 0 to 1. The eighth clock pulse indexes counter 91 from 1 to 2. The ninth clock pulse indexes counter 91 from 2 to 3. The delayed ninth clock pulse from network 99 resets counter 91 to 0 and passes through AND circuit 109 to reset item counter 93 to 1. The purpose of delay network 113 is to insure that the delayed ninth clock pulse passes through AND circuit 109 before item counter 93 is reset to 1, disabling AND circuit 109. The signal which resets counter 93 to 1 causes retrace of sweep generator 13 which quickly slews galvanometer 22 of the optical synchronizer 19 to reposition the light beam to the left of the first marking position in any row. The retrace signal also disables AND circuit 33 so that no clock pulses are provided during retrace which would tend to disturb mark position counter 91 from a 0 output or item counter 93 from a 1 output.

When the second row mark 41 passes the scanning position, row detector 15 produces a pulse which is passed through AND circuit 29 to index row counter 49 from 1 to 2 and to trigger sweep generator 13 again. Synchronizer 19 causes the light beam to move from left-to-right along the second row of marking positions until the signal from network 113 causes retrace of sweep generator 13 and consequent repositioning of the light beam of optical synchronizer 19 to the left of the first marking position in the rows. Thus the row marks 41 index row counter 49 sequentially from 2 through 10. After retrace for the tenth row, the light beam is repositioned for scanning the first row of a subsequent paper fed to drum 21. When paper 17 leaves the scanning position, band 23 is exposed to detector 25. Paper detector 25 produces an output which resets row counter 49 to 0 and disables AND circuit 29, preventing extraneous signals of row detector 15 due to dirt on scanning drum 21 from triggering sweep generator 13. The circuit now remains quiescent until a subsequent paper reaches the scanning position and masks black band 23 so that the output of paper detector 25 again drops to ground enabling AND circuit to respond to row detector 15.

Assume battery 11 provides 20 volts. Assume the gain of mark photomultiplier 36 is such that a most intense black mark causes a positive output of 21 volts. The slider of potentiometer 127 is adjustable between 1 and 5 volts of background noise. It will be noted that the various marking positions are defined by fine dotted lines which will produce some small output from mark sensor 36 even in the absence of any marking by the candidate. Furthermore, erasures by a candidate will produce some output due to light absorption by the roughened surface of paper 17. Assume that the lightly dotted lines indicating marking positions and that normal erasures by a candidate produce an output from mark sensor 36 which is considerably less than 1 volt. The slider of background noise potentiometer 127 may be then adjusted to the minimum 1 volt level. Crystal 35 clips off 1 volt from the output of mark sensor 36. Hence a most intense black mark will produce only a 20 volt pulse through capacitor 39 to the input of buffer amplifier 51. Each of buffer amplifiers 51, 59, 67, and 73 may comprise simple unity-gain transistor emitter followers. The same clock pulse which indexes counter 91 also enables gate 53. Since the clock and mark intensity pulses occur synchronously, the voltage representing intensity of a candidate's mark is passed through gate 53 to charge storage capacitor 57. Crystal 61 permits only the unilateral charging of storage capacitor 65. Thus the voltage of the capacitor 65 will be equal to or greater than that of capacitor 57. Each delayed clock pulse from network 99 triggers gate 55 discharging capacitor 57. Capacitor 65 is thus charged proportionally to the most intense of the marks which have been thus far read. Capacitor 57 is charged proportionally to the intensity of the mark presently read. The delayed clock pulse from network 99 actuates gate 69 to charge capacitor 71 proportionally to the most intense of all marks previously read. At the end of each item, comprising three marking positions, the output of AND circuit 105 actuates gate 63, discharging capacitor 65. Capacitor 71 is discharged simultaneously with capacitor 65 through gate 69. Each time capacitor 65 is charged to a higher voltage level, indicating a mark of greater intensity than any mark which has been previously read, a pulse is coupled through differentiating capacitor 87. This triggers monostable flip-flop 89 and actuates gates 121. If the candidate has placed a mark in the first marking position of an item, then the 1 output of counter 91 will charge capacitor 47. If the candidate has marked the second marking position with even greater intensity, then the unilateral charging of capacitor 65 through crystal 61 produces an output from monostable flip-flop 89 which actuates gates 121 to charge capacitor 45 and discharge capacitor 47. If the candidate has marked the third marking position with an even greater intensity, then the actuation of gates 121 will charge capacitor 43 and discharge capacitor 45. At the end of an item only one of capacitors 43, 45, and 47 will be charged even though the candidate may have marked all three marking positions with sequentially greater intensity. If a candidate marks an initial marking position with greater intensity and a subsequent marking position with lesser intensity, then no unilateral charging of capacitor 65 will result for such subsequent marking position. Consequently gates 121 are not actuated; and the previously charged capacitor stores the position of such previous marking.

The voltage at the input terminal of differential amplifier 143 is proportional to the most intense of all previously read marks. The voltage at the input terminal of differential amplifier 145 is proportional to the intensity of the presently read mark. The potential at the sliders 133 and 139 are adjustable between 50 percent and 90 percent of the voltage existing at the input terminals of differential amplifiers 143 and 145 respectively. Assume that the ganged sliders of potentiometers 133 and 139 are at the 50 percent position. If the presently read mark is more than twice as intense as the maximum of all previously read marks, then the voltage at the input terminal of differential amplifier 143 will be less than the voltage at its reference terminal. Differential amplifier 143 produces no output, thereby enabling AND circuit 151. The delayed clock pulse from network 95 causes AND circuit 151 to trigger flip-flop 153 to the NO condition where it provides no output. The absence of output from differential amplifier 143 prevents the three-input AND circuit 155 from operating in response to the delayed clock pulse from network 95. If the presently read mark is less than twice the intensity of the maximum of all previously read marks, then differential amplifier 143 will provide an output which partially enables AND circuit 155 and disables AND circuit 151. If the presently read mark is less than half as intense as the maximum of all previously read marks, then the voltage at the input terminal of differential amplifier 145 will be less than the voltage existing at the reference terminal of differential amplifier 145. Accordingly, differential amplifier 145 produces no output and prevents AND circuit 155 from responding to the delayed clock pulse from network 95. If the presently read mark is greater than half the intensity of the maximum of all previously read marks, then differential amplifier 145 will provide an output partially enabling AND circuit 155. Thus if the presently read mark is greater than half but less than twice the maximum of all previously read marks, AND circuit 155 is completely enabled. The delayed clock pulse from network 95 will pass through AND circuit 155, triggering multiple mark flip-flop 153 to a YES condition where it provides an output signal.

There are three regions of interest in the multiple mark detecting circuit. In the first region the presently read mark is sufficiently greater than the maximum of all previously read marks that differential amplifier 143 provides no output, thereby enabling AND circuit 151 to trigger flip-flop 153 to the NO condition. In the first region, the absence of output from differential amplifier 143 disables AND circuit 155. In the second region the presently read mark does not differ sufficiently from the maximum of all previously read marks to prevent outputs from either of differential amplifiers 143 and 145. When outputs simultaneously exist from both differential amplifiers 143 and 145, AND circuit 155 is enabled to trigger flip-flop 153 to its YES condition. In the second region, the output from differential amplifier 143 disables AND circuit 151. In the third region the presently read mark is sufficiently less than maximum of all previously read marks that differential amplifier 145 provides no output, thereby disabling AND circuit 155. In the third region the presence of an output from differential amplifier 143 disables AND circuit 151. In the third region then neither of AND circuits 151 or 155 is enabled. Flip-flop 153 is permitted to remain in its previously existing condition. Once flip-flop 153 has been triggered to a YES condition, indicating that the two most intense marks of those which have been read are of substantially the same intensity, it can only be triggered to the NO condition if there is a subsequent mark greater than twice the intensity of the greater of the two marks creating the multiple mark condition. It will be noted that a subsequent mark of less than half the intensity of the two substantially equal marks creating the multiple mark condition will not affect the state of flip-flop 159. It will be permitted to remain in a YES state, indicating the continued existence of a multiple mark condition.

A problem exists in the multiple mark circuit if the candidate omits marking an item or erases all marks in an item. For an omitted item, no output will appear from either of buffer amplifiers 73 and 59. Assume for the moment that the slider of potentiometer 139 were directly connected to the reference terminal of differential amplifier 143 and that the connection including crystal 147 were omitted. For an omitted item, differential amplifiers 143 and 145 would be operating with equal input voltages substantially equal to zero. A minute drift in differential amplifiers 143 and 145 might readily cause an output to be produced from both because of their high gain. This would cause AND circuit 155 to trigger flip-flop 153 to the YES condition erroneously indicating the presence of a multiple mark, whereas the candidate has actually omitted the item. Accordingly, the crystal 147 is employed to bias the reference terminal of differential amplifier 143 positively so that the reference terminal potential is either the voltage at slider 139 or the voltage at the junction of resistors 83 and 85, whichever is greater. The set-off potential existing at the junction of resistors 83 and 85 insures that differential amplifier 143 provides no output if the candidate has omitted an item. The lack of output from differential amplifier 143 disables AND circuit 155 and enables AND circuit 151 so that flip-flop 153 will be forced to the NO condition.

The presence of the set-off bias through crystal 147 at the reference terminal of differential amplifier 143 interferes with the operation of the multiple mark circuit for detecting signal ratios unless the signal at the input terminal of differential amplifier 143 slightly exceeds the set-off bias. Assume the set-off bias to be 0.9 volt. The signal at the input terminal of differential amplifier 143 represents the maximum intensity of all marks previously read. Assume that the candidate has marked a plurality of positions and that it is the last of the positions marked by the candidate which is presently being read. The critical condition arises when the signal at the input terminal of differential amplifier 143, representing the maximum intensity of marks previously read, is 0.9 volt. With the ganged sliders 133 and 139 at the 50 percent position, the voltage at the reference terminal of differential amplifier 145 will be 0.45 volt. Assume that the presently read mark produces 0.45 volt at the input terminal of differential amplifier 145. For this condition each of differential amplifiers 143 and 145 may drift sufficiently to provide outputs indicating a multiple mark condition. Assume now that the presently read mark produces 1.8 volts at the input terminal of differential amplifier 145. For this condition differential amplifier 145 provides an output partially enabling AND circuit 155. Differential amplifier 143 may drift sufficiently either to completely enable AND circuit 155 and trigger flip-flop 153 to the YES condition or to enable AND circuit 151 and trigger flip-flop 153 to the NO condition. The set-off bias through crystal 147 does not interfere with the operation of the multiple mark circuit provided there is at least one mark having an intensity of 1.8 volts or greater.

It will be noted that to produce a 0.9 volt set-off bias through crystal 47, it is necessary that the slider of potentiometer 77 be positioned at 2 volts. Thus differential amplifier 81 provides no output unless the maximum intensity mark provides at least 2 volts output from buffer amplifier 67. The output of differential amplifier 81 controls the unscorable flip-flop 159. An item is considered unscorable unless, of the marks present, there is at least one having an amplitude of 2 volts or greater. The multiple mark circuit will properly indicate a multiple mark condition if the mark of maximum amplitude is at least 1.8 volts. My mark selection circuit is arranged so that an unscorable item takes precedence over a multiple mark item. If the maximum amplitude mark is less than 1.8 volts, the multiple mark circuit may not operate properly; but, in such event the resulting unscorable output will take precedence. If the maximum amplitude mark is between 1.8 and 2 volts, the multiple mark circuit will function properly; however, the resulting unscorable output again takes precedence. It is only if the maximum amplitude mark is greater than 2 volts that the unscorable circuit is deactivated thereby permitting the output of the multiple mark circuit to be effective.

It will be noted that the ganged sliders 133 and 139 are adjustable to a minimum 50% position. Accordingly, the voltage divider comprising resistors 83 and 85 causes a greater than 2 to 1 division of the unscorable reference voltage existing at slider 77 and the reference terminal of differential amplifier 81. I have shown the set-off voltage through crystal 47 to be only 45% of the unscorable reference voltage of differential amplifier 81. This allows a margin of safety so that the multiple mark circuit will operate properly at a lower maximum mark intensity than will the unscorable circuit, which responds to differential amplifier 81, even though the ganged sliders be positioned at the minimum 50% value. The unscorable level voltage at slider 77 is adjustable between 1 and 5 volts. This simultaneously adjusts the set-off voltage of the multiple mark circuit to 45% of this value. Since a most intense black mark produces 20 volts from background clipping crystal 35, an unscorable level of 2 volts represents only 10% of this value and permits the proper scoring of moderately faint marks. I have found that a 70% setting of the ganged sliders 133 and 137 gives good results in practice.

Upon reading any marking position which the candidate has marked with a greater intensity than any preceding marking position, an output pulse from monostable flip-flop 89 enables AND circuit 157. If such mark is less than the unscorable level of 2 volts, then no output appears from differential amplifier 81. This causes AND circuit 157 to trigger flip-flop 159 to a YES condition indicating that a mark is present but that such mark is unscorable. As soon as a mark is read having an intensity greater than 2 volts, the resulting output from differential amplifier 81 disables AND circuit 151 and triggers flip-flop 159 to the NO condition indicating that the item is scorable.

If no multiple mark condition exists, flip-flop 153 provides no output. This enables AND circuit 161. The 3 output from mark position counter 91 enables AND circuit 169. The delayed clock pulse output from network 97 passes through AND circuits 169 and 161 to actuate multiple gates 123. If the candidate has omitted the item, then no output will appear at any of terminals A, B, and C. However, if the candidate has marked an item, then one of capacitors 43, 45, and 47 will be charged; and multiple gates 123 will couple the signal to one of terminals A, B, and C.

If a multiple mark condition does exist, then flip-flop 153 provides an output signal which disables AND circuit 161 and enables AND circuit 163. Upon a 3 output from mark position counter 91, the delayed clock pulse from network 97 passes through AND circuits 169 and 163 to terminal W. The disabling of AND circuit 161 prevents any output from appearing at terminals A, B, and C even though the candidate may have marked the correct answer with greatest intensity. The presence of a multiple mark condition prevents the actuation of multiple gates 123 and forces a "wrong" output at terminal W because of multiple guessing.

If any item is unscorable, then an output is produced from flip-flop 159 which is coupled through crystal 179 to enable AND circuit 181. Upon a 3 output from mark position counter 91, the delayed clock pulse from network 97 passes through AND circuits 169 and 181 to the paper shunting mechanism 27. Papers in scanning drum 21 are normally passed to a first stack of graded papers. Upon actuation of paper shunt 27, the paper in scanning drum 21 is passed to a second stack for manual interpretation. If a candidate's paper contains an unscorable item, then his paper will be shunted aside for manual rather than machine scoring.

It will be noted that the 1, 2, 3, and 7 outputs of row counter 49 enable AND circuits 171 and 173. In these rows are contained candidate information, such as school and seat and the identification of Tests I and II. If, for any of the three items in any of these four rows, there exists a multiple mark, then the output of flip-flop 153 will be coupled through AND circuit 173 to enable AND circuit 181. At the end of each item, the 3 output from mark position counter 91 in conjunction with the delayed clock pulse from network 97 causes AND circuit 169 to provide an output which passes through AND circuit 181 to the paper shunting mechanism 27. Similarly, if, for any of the items in these four rows, the candidate fails to make a mark or marks so faintly that no output appears from differential amplifier 81, then AND circuit 171 will provide an output which is coupled through AND circuit 181 to the paper shunting mechanism 27.

Thus the answer paper is shunted aside firstly, if any item provides an unscorable output from flip-flop 159; secondly, if the candidate fails to mark any item in rows 1, 2, 3, and 7 with a mark exceeding the unscorable level; and thirdly, if the candidate makes a multiple mark in any item of rows 1, 2, 3, and 7.

Since my mark selection circuit operates in a serial manner, the timing of events is of importance. Serially connected networks 95, 97, and 99 provide sequential delays in their respective outputs. A clock pulse and a mark output occur at the same time. The mark output charges capacitor 57 and also capacitor 65 if the presently read mark is greater than the previously read marks. Then the delayed clock pulse output from network 95 operates upon AND circuits 151 and 155 associated with multiple mark flip-flop 153. Then, for a 3 output from mark position counter 91, the doubly delayed clock pulse output from network 97 is coupled through AND circuit 169 to AND circuits 161, 163, and 181. Finally the triply delayed clock pulse output from network 99 discharges capacitor 57 and charges capacitor 71 to the potential of capacitor 65 and, for a 3 output from mark position counter 91, discharges capacitors 65 and 71.

Multiple-mark flip-flop 153 is reset to the NO condition at the beginning of each item. At the end of each item, the discharging of capacitor 71 by the triply delayed clock pulse from network 99 for a 3 output from mark position counter 91 reduces to zero the input voltage of differential amplifier 143. The set-off bias at the junction of resistors 83 and 85 causes differential amplifier 143 to enable AND circuit 151. The delayed clock pulse from network 95 for the first marking position of each item causes AND circuit 151 to trigger flip-flop 153 to the NO condition. Thus flip-flop 153 is reset to the NO condition during the first clock period of each item. This prevents a multiple-mark condition for one item from being perpetuated for the succeeding item and avoids the improper indication of a wrong answer where the candidate has omitted such succeeding item.

It will be noted that the voltage of capacitor 57, representing the intensity of the presently read mark, exists only during the time interval between a clock pulse from AND circuit 33 and a triply delayed clock pulse from network 99. Hence a signal at the input terminal of differential amplifier 145 proportional to the intensity of the presently read mark will be present only during the time interval between the actuation of gates 53 and 55. Accordingly, AND circuits 151 and 153 are enabled during this time interval by a delayed clock pulse from network 95.

In the form of test sheet shown in FIGURE 2, the first item is a candidate information item. For this form it is not necessary to reset the unscorable flip-flop 159 to the NO condition at the beginning of each paper. If unscorable flip-flop 159 is in the YES condition at the beginning of a paper, then the condition will be perpetuated only if the candidate omits the first item. However, the paper would be shunted aside in any event because of the omitted candidate information item. It will be appreciated that in a form of test sheet containing only answer items, it would become necessary to reset flip-flop 159 to the NO condition to prevent the shunting of a paper where the candidate has omitted the first item. The output of AND circuit 29 may be coupled to the NO terminal of flip-flop 159, thereby resetting it at the beginning of each row. Alternatively, the output of paper detector 25 may be used to reset the unscorable flip-flop between papers.

Delay network 113 may incorporate a pulse-lengthening circuit to insure the disabling of AND circuit 33 during the entire retrace period of sweep generator 13. As will be further appreciated by those skilled in the art, diode 61 may be inserted anywhere between capacitors 57 and 65. I have shown diode 61 inserted between the output of amplifier 59 and capacitor 65, but diode 61 may instead be inserted between capacitor 57 and the input of amplifier 59.

The useful outputs of my mark selection circuit, which are coupled to a conventional computer well known to the art, comprise the 1 through 10 outputs of row counter 49, the 1, 2, and 3 outputs of item counter 93, the resolved mark position outputs at terminals A, B, C, and W, and the paper shunting signal at terminal R. As will be appreciated by those skilled in the art, the signal at terminal R is used to clear the computer and reject all previously processed information from a particular paper.

It will be seen that I have accomplished the objects of my invention. I have provided a mark selection circuit in which one of capacitors 43, 45, and 47 is charged to provide an intermediate output indicating the marking position of greatest intensity, provided of course that there is some mark which exceeds the background level of clipping crystal 35. In my mark selection circuit the ratio of intensities of the two most intense marks is compared with unity to determine if the candidate has made a multiple mark. If the candidate has multiply marked an answer item, then my circuit forces a "wrong" response at terminal W even though the most intensely marked item be correct. If the candidate has multiply marked a candidate information item, then the paper is shunted aside for manual interpretation. My multiple mark circuit is provided with a set-off bias to insure proper operation. My mark selection circuit also includes an unscorable level circuit which causes papers to be shunted aside where marks exceeding the background clipping level are present but are so faint as to be less than the unscorable level. In my circuit there is a correlation between the operation of the unscorable level and multiple mark circuits. The set-off bias of the multiple mark circuit is sufficiently less than the unscorable level that the multiple mark circuit will operate properly at smaller signal intensities than the unscorable level. Further my mark selection circuit causes a paper to be shunted aside for manual interpretation if the candidate fails to mark an item of candidate information with an intensity exceeding the unscorable level.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A mark selection circuit including in combination means for serially reading the intensity of marks in an item having a plurality of marking positions, means for providing a first signal in accord with the mark intensity of the position presently being read, means for providing a second signal in accord with the greatest mark intensity of the positions previously having been read, a device having two stable states, means for comparing the first and second signals, the comparing means selectively providing a first output when the ratio of the first signal to the second signal exceeds a first number which is greater than unity and providing a second output when said ratio is less than the first number but greater than a second number which is less than unity, means responsive to the first output for forcing the device to a first state, and means responsive to the second output for forcing the device to the second state, the comparing means permitting the state of the device to remain constant when said ratio is less than said second number.

2. A mark selection circuit including in combination means for serially reading the intensity of marks in an item having a plurality of marking positions, means for providing a first signal in accord with the mark intensity of the position presently being read, means for providing a second signal in accord with the greatest mark intensity of the positions previously having been read, a first and a second comparator each having a pair of input terminals and each providing an output, means coupling the first signal to one input terminal of the first comparator, means coupling the second signal to one input terminal of the second comparator, means for coupling a third signal which is a predetermined fraction of the first signal to the second input terminal of the second comparator, means for coupling a fractional portion of the second signal to the other input terminal of the first comparator, a device having two stable states, means responsive to the output of the second comparator for forcing the device to a first state, and means responsive to the output of the first and second comparators for forcing the device to the second state.

3. A mark selection circuit as in claim 2 which further includes means for providing a fourth signal in accord with the greatest mark intensity in any position of said item, means for providing a reference signal, means for comparing the fourth and reference signals, and means for coupling a bias signal to the second input terminal of the second comparator, the ratio of the bias signal to the reference signal being less than the predetermined fraction, and the means for coupling the third and bias signals to the second input terminal of the second comparator comprising an OR circuit.

4. A mark selection circuit including in combination means for serially reading the intensity of marks in an item having a plurality of marking positions, means for providing a first signal in accord with the mark intensity of the position presently being read, means for providing a second signal in accord with the greatest mark intensity of the positions previously having been read, means providing a reference signal, means providing a bias signal, means for providing a third signal in accord with the greatest mark intensity in any position of said item, first means for comparing the third and reference signals, a device having two stable states, second means for comparing the first and second and bias signals, the second comparing means selectively providing a first output when a first ratio of the first signal to the second signal exceeds a first number which is greater than unity and providing a second output when the first ratio is less than said first number but greater than a second number which is less than unity, the second comparing means providing said first output irrespective of the first ratio when the bias signal exceeds the second signal, the ratio of the reference signal to the bias signal being greater than the first number, means responsive to the first output for forcing the device to a first state, and means responsive to the second output for forcing the device to the second state.

5. A mark selection circuit including in combination means for serially reading the intensity of marks in an item having a plurality of marking positions, means for providing a first signal in accord with the greatest mark intensity of the positions which have been thus far read, means providing a reference signal, means for comparing the first signal and the reference signal, the comparing means providing an output when the first signal exceeds the reference signal, a device having two stable states, means responsive to a change in the first signal for forcing the device to a first state, and means responsive to the output of the comparing means for forcing the device to the second state.

6. A mark selection circuit as in claim 5 which further includes mean responsive to the output of the comparing means for disabling the means for forcing the device to the first state.

7. A mark selection circuit for a scoring machine including in combination means for providing signals in accord with the intensity of marks in an item having a plurality of marking positions, a multiple mark circuit responsive to the two greatest of said signals, means establishing a reference level, an unscorable circuit responsive to the greatest of said signals and to the reference level, and means for disabling the multiple mark circuit when said greatest signal is less than a predetermined level which is lower than the reference level.

8. A mark selection circuit including in combination means for providing signals in accord with the intensity of marks in an item having a plurality of marking positions, means responsive to said signals for providing an output when the ratio of the two greatest of said signals is less than a first number which is greater than unity but greater than a second number which is less than unity, means providing a reference signal, means for comparing the reference signal and the greatest of said signals, and means for coupling to the output means a bias signal which is less than the reference signal.

9. A mark selection circuit for a record having an item provided with a plurality of marking positions including in combination means for providing signals in accord with the intensity of marks in the item, means establishing a lower background level, means establishing an upper reference level, and means for comparing the greatest of said signals with the upper and lower levels, the comparing means providing an unscorable output when the greatest of said signals is within the region bounded by the upper and lower levels.

10. A mark selection circuit as in claim 9 which further includes means responsive to the comparing means for delivering a record selectively to a first collection of records and to a second collection of records.

11. A mark selection circuit for an item provided with a plurality of marking positions including in combination means providing signals in accord with the intensity of marks in the item, and means responsive to the ratio of the two greatest of said signals for providing a multiple mark output when said ratio is less than a first number which is greater than unity but greater than a second number which is less than unity.

12. A mark selection circuit including in combination means for providing signals in accord with the intensity of marks in an item having a plurality of marking positions, selective means responsive to said signals for providing a first output when the ratio of the two greatest of said signals is within a region bounded by a first number which is greater than unity and a second number which is less than unity, means providing a tentative output in accord with the marking position of the greatest of said signals, and means responsive to the first output for providing an overriding output which defeats the tentative output.

13. A mark selection circuit for a test scoring machine including in combination means for providing signals in accord with the intensity of marks in a test answer item having a plurality of marking positions, means responsive to said signals for selectively providing a first output in the presence of a multiple mark condition and a second output in the absence of such condition, means or providing a tentative output in accord with the marking position of the greatest of said signals, means responsive to the second output for providing a first final output in accord with the tentative output, and means responsive to the first output for providing a second final output indicating a wrong answer in said test answer item.

14. A mark selection circuit for a record having a plurality of items each provided with a plurality of marking positions including in combination means for providing a first output identifying a certain one of the items, means providing a plurality of signals in accord with the intensity of marks in the various marking positions of said item, means responsive to said signals for providing a second output in the presence of a multiple mark condition, and means responsive to the first and second outputs for providing a third output.

15. A mark selection circuit as in claim 14 which further includes means responsive to the third output means for delivering a record selectively to a first collection of records and to a second collection of records.

16. A mark selection circuit for a record having a plurality of items each provided with a plurality of marking positions including in combination means for providing a first output identifying a certain one of the items, means providing a reference signal, means providing a first signal in accord with the mark of greatest intensity in the various marking positions of said item, means responsive to the reference signal and the first signal for providing a second output when the reference signal exceeds said first signal, and means responsive to the first and second outputs for providing a third output.

17. A mark selection circuit as in claim 16 which further includes means responsive to the third output means for delivering a record selectively to a first collection of records and to a second collection of records.

18. A mark selection circuit including in combination means for serially providing first signals in accord with the intensity of marks in an item having a plurality of marking positions, means for providing second signals in synchronism with the various marking positions of the item, means for time delaying the second signals, first means for storing the first signals, second storage means, means for unilaterally coupling the first storage means to the second storage means, the coupling means including a gate, and means responsive to the time delayed signals for actuating the gate.

19. A mark selection circuit including in combination means for serially providing first signals in accord with the intensity of marks in an item having a plurality of marking positions, means for providing second signals in synchronism with the various marking position of the item, means for time delaying the second signals, first means for storing the first signals, second storage means, means for unilaterally coupling the first storage means to the second storage means, third storage means, means including a gate for coupling the second storage means to the third storage means, and means responsive to the time delayed signals for actuating the gate.

20. A mark selection circuit including in combination means for serially providing first signals in accord with the intensity of marks in an item having a plurality of marking positions, means for providing second signals in synchronism with the various marking positions of the item, means for time delaying the second signals to provide third signals, means for time delaying the third signals to provide fourth signals, first means for storing the first signals, second storage means, means including a gate for coupling the first storage means to the second storage means, means responsive to the first and second storage means for detecting a multiple mark condition, means responsive to the third signals for enabling the multiple mark detecting means, and means responsive to the fourth signals for actuating the gate.

21. A mark selection circuit for a paper provided with a plurality of items comprising a candidate information item and a test answer item, each item having a plurality of marking positions, including in combination means for serially providing first signals in accord with the intensity of marks in the various marking positions of the various items, means for providing second signals in synchronism with the various marking positions of the various items, means providing a background signal, means for providing third signals in accord with the excess of the first signals above the background signal, first means for storing the third signals, second signal storage means, means for unilaterally coupling the first storage means to the second storage means, third signal storage means, means including a first gate for coupling the second storage means to the third storage means, means providing a reference signal, means responsive to the second signals for providing mark position signals, fourth storage means, means including a second gate for coupling the mark position signals to the fourth storage means, means responsive to a change in signal of the second storage means for providing a trigger signal, means responsive to the trigger signal for actuating the second gate, an output gate, means coupling the fourth storage means to the output gate, means for time delaying the second signals to provide fourth signals, means for time delaying the fourth signals to provide fifth signals, means responsive to the fifth signals for actuating the first gate, means responsive to the first and third storage means for providing a first output in the presence of a multiple mark condition and a second output in the absence of such condition, means responsive to the fourth signals for enabling the multiple mark circuit, means for biasing the multiple mark circuit with a fractional portion of the reference signal, comparing means responsive to the reference signal and to the second storage means, the comparing means providing a third output for at least a no mark condition, circuitry responsive to the third output and to the trigger signal, the circuitry providing a fourth output in the presence of an unscorably faint mark condition, means responsive to the mark position signal of the last marking position in an item and to the fifth signals for providing a fifth output, means responsive to the second and fifth outputs for actuating the output gate, means responsive to the first and fifth outputs for providing a sixth output indicating a wrong answer in a test answer item, means for providing a seventh output identifying a candidate information item, means responsive to the first and seventh outputs for providing an eighth output, means responsive to the third and seventh outputs for providing a ninth output indicating at least the omission of a candidate information item, means for providing a tenth output in response to each one of the fourth and eighth and ninth outputs, and means responsive to the fifth and tenth output means for delivering a paper selectively to a first stack of papers and to a second stack of papers.

References Cited by the Examiner

UNITED STATES PATENTS

| | | | |
|---|---|---|---|
| 2,717,460 | 9/55 | Stibitz | 235—61.7 |
| 2,939,110 | 5/60 | Beattie | 235—61.7 |
| 2,939,124 | 5/60 | Saxenmeyr | 235—61.7 |
| 2,944,734 | 7/60 | Martin | 235—61.7 |

MALCOLM A. MORRISON, *Primary Examiner.*

WALTER W. BURNS, JR., *Examiner.*